*G. P. Ketcham, Jr.,*
*Reciprocating Saw Mill,*
Nº 19,300. Patented Feb. 9, 1858.
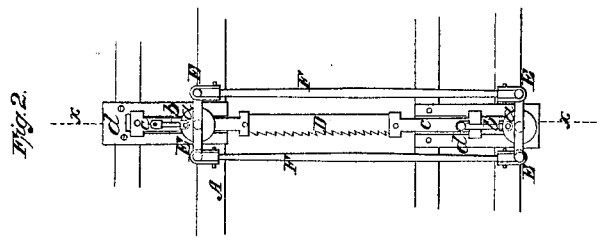
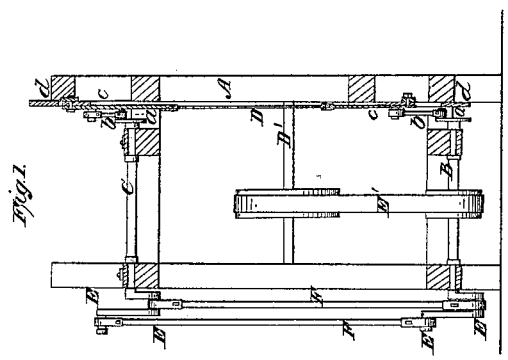

UNITED STATES PATENT OFFICE.

G. P. KETCHAM, JR., OF BLOOMINGTON, INDIANA.

METHOD OF STRAINING RECIPROCATING SAWS.

Specification of Letters Patent No. 19,300, dated February 9, 1858.

*To all whom it may concern:*

Be it known that I, G. P. KETCHAM, Jr., of Bloomington, in the county of Monroe and State of Indiana, have invented a new and useful Improvement in Sawmills; and I do hereby declare that the following is a full, clear, and exact description of the same, reference being had to the annexed drawings, making a part of this specification, in which—

Figure 1, is a front view of the working parts of my improvement the framing and saw slides and guides being vertically bisected as indicated by the line $(x)$, $(x)$, Fig. 2. Fig. 2, is a side view of ditto.

Similar letters of reference indicate corresponding parts in the two figures.

This invention relates to an improvement in that class of reciprocating saw mills in which a sash or gate is dispensed with. The invention consists in the novel means employed for straining and driving the saw as hereinafter described.

To enable those skilled in the art to fully understand and construct my invention I will proceed to describe it.

A, represents a framing which may be constructed in any proper manner to support the working parts.

B, C, are two horizontal shafts one of which B, is at the lower and the other C, at the upper part of the framing. D′, is a driving or power shaft placed in the framing and from which power is transmitted to the shaft B, by a belt E′, or its equivalent.

To one end of each of the shafts B, C, a crank pulley $(a)$ is attached and a short pitman $(b)$ is attached to each crank pulley. These pitmen are connected each to slides $(c)$ $(c)$ which are fitted in guides $(d)$, $(d)$, attached to the framing, the guides being in line or one directly over the other.

To the lower end of the upper slide and to the upper end one a saw D, is attached, the slides $(c)$ $(c)$ being at such a distance apart as to keep the saw perfectly taut or "strained" as it is termed, any suitable means for fastening the saw to the slides may be adopted.

To the ends of the shafts B, C, opposite to that where the crank pulleys are attached, there are cranks E, E, two on each shaft, the two cranks of each shaft are in reversed position and the cranks of the two shafts are connected by pitmen F, F.

By referring to the drawings it will be seen that the cranks and the crank pulleys of the two shafts always coincide in position and that the two shafts being connected by the pitmen F, F, at one end, and the saw D, slides $(c)$ $(c)$ crank pulleys $(a)$ $(a)$ and pitmen $(b)$, $(b)$ at the opposite ends, the saw D, will have a reciprocating motion communicated to it as the shafts B, C, rotate and the saw will be kept equally strained at all points of its stroke, for the working parts will have the same relative position with each other at all points of their movement. One pitman F, might answer but I prefer two in order to insure a perfect arbitrary movement of the two shafts.

Saws according to this improvement may be put up at a moderate cost and there are no parts liable to become deranged by wear. Very little friction is produced or caused by its operation, and the improvement may be applied to large and small saws.

I do not claim broadly and separately, connecting a saw at both ends to crank pulleys; but

I claim as new and desire to secure by Letters Patent—

Connecting the slides $(c)$ $(c)$ at both ends of the saw to cranks $(a)$ $(a)$ on the shafts B, C, by means of pitman $(b)$, the opposite ends of the shafts, B, C, being connected by the crank or cranks E, and pitman or pitmen F, whereby the shafts are made to move simultaneously and the same relative positions of their cranks and working parts connected therewith retained at all points of their movement and the saw D, operated or driven and kept equally strained, or at the same degree of tension at all points of its stroke substantially as described.

G. P. KETCHAM, Jr.

Witnesses:
COLBY H. GERY,
JOHN I. CAUL.